[11] Patent Number: 4,543,284
[45] Date of Patent: Sep. 24, 1985

Baum

[54] VENEER LAMINATE COMPOSITE STRUCTURE

[76] Inventor: Charles S. Baum, 34108 E. Jefferson, St. Clair Shores, Mich. 48082

[21] Appl. No.: 649,215

[22] Filed: Sep. 10, 1984

[51] Int. Cl.⁴ .................. B32B 3/00; B32B 21/04; B32B 27/38

[52] U.S. Cl. .................. 428/106; 428/172; 428/438; 428/414; 428/511; 428/415; 428/537.1; 428/537.5; 428/475.5; 428/461; 156/245; 114/358

[58] Field of Search .............. 428/106, 172, 414, 438, 428/415, 537.1, 511, 537.5

[56] References Cited

U.S. PATENT DOCUMENTS

| | | | |
|---|---|---|---|
| 2,276,004 | 3/1942 | Vidal | 144/309 |
| 3,729,368 | 4/1973 | Ingham et al. | 928/151 X |
| 4,271,649 | 6/1981 | Belanger | 428/438 |
| 4,343,846 | 8/1982 | Kohn | 428/138 |
| 4,428,993 | 1/1984 | Kohn | 428/117 |

*Primary Examiner*—Patricia C. Ives
*Attorney, Agent, or Firm*—Krass and Young

[57] ABSTRACT

A veneer laminate composite structure particularly suitable for use in boat building. The structure comprises a first sheet of wood veneer having its grain extending generally in the plane of the sheet; a second sheet of wood veneer juxtaposed to the first sheet and having its grain extending generally in the plane of the sheet but generally at cross angles with respect to the grain of the first sheet of wood veneer; a resin interposed between and bonding the wood veneer sheets together; a first sheet of fiberglass juxtaposed to the second sheet of wood veneer; further resin interposed between and bonding the second sheet of wood veneer and the first sheet of fiberglass; a sheet of end core balsa wood juxtaposed to the first sheet of fiberglass; further resin interposed between and bonding the sheet of end core balsa wood and the first sheet of fiberglass; a second sheet of fiberglass juxtaposed to the sheet of end core balsa wood; and further resin interposed between and bonding the sheet of end core balsa wood to the second sheet of fiberglass.

10 Claims, 3 Drawing Figures

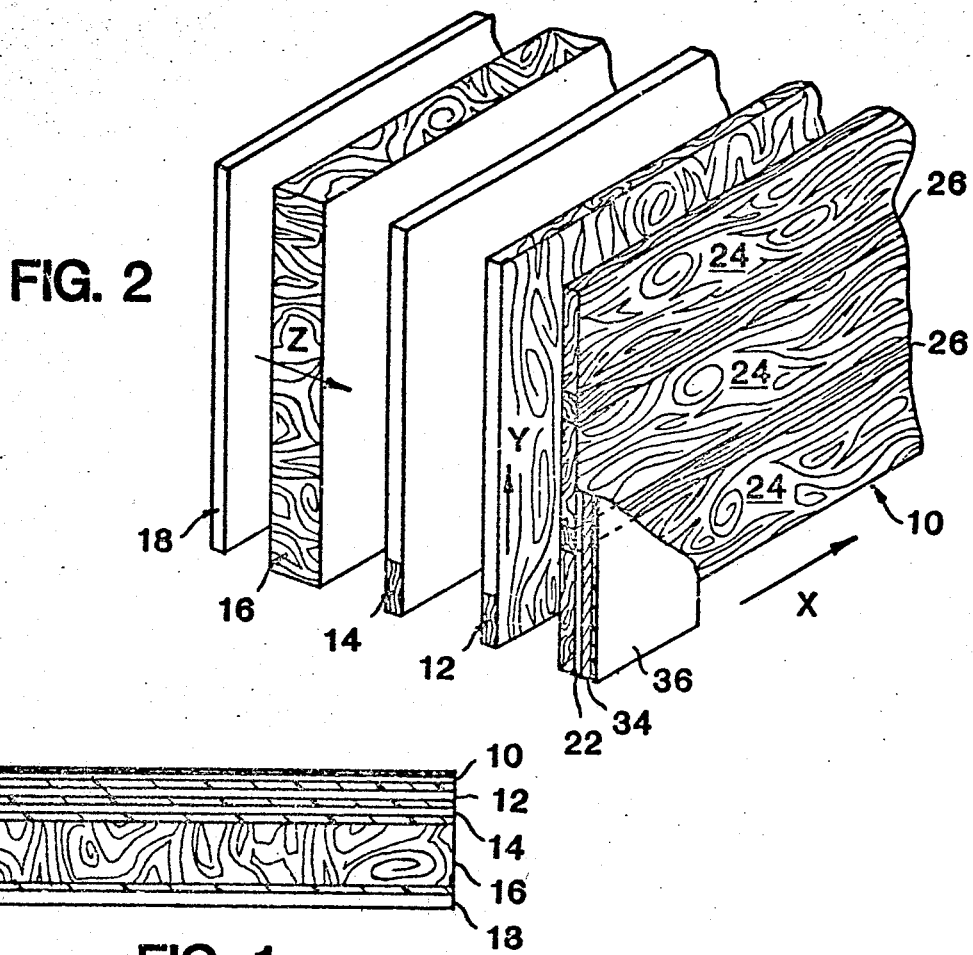
FIG. 2
FIG. 1
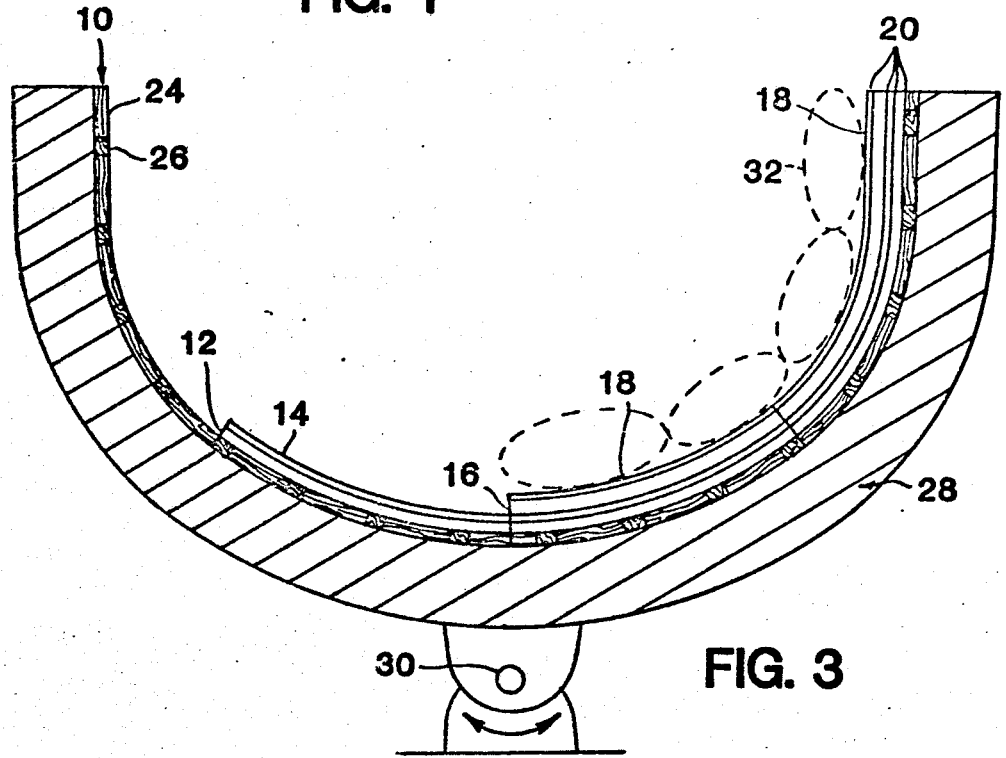
FIG. 3

VENEER LAMINATE COMPOSITE STRUCTURE

BACKGROUND OF THE INVENTION

This application relates to composite structures and, more particularly, to a veneer laminate composite structure particularly suitable for use in boat building.

At one time boats were made almost exclusively of wood. Gradually, however, wood has fallen out of favor as a boat building material because of the high maintenance costs and short boat life resulting from rot, paint peeling, instability, swelling and warping. Metals and fiberglass constructions have gradually accounted for the vast majority of boats of every size and description and wood, conversely, has been relegated to use in selected custom applications where initial labor costs and/or maintenance are not controlling factors. However, wood in most respects is an excellent building material due to its stiffness, light weight and fatigue resistance. It's shortcomings are primarily moisture related and these shortcomings are, of course, exacerbated when applied in the boat building art.

SUMMARY OF THE INVENTION

The present invention concerns a veneer laminate composite structure which is particularly suitable for boat building and which retains all of the inherent advantages of wood while eliminating the inherent disadvantages of wood, particularly the moisture related disadvantages that have plagued previous wooden boats.

The invention veneer laminate structure in its broadest sense comprises at least one sheet of wood veneer, a sheet of synthetic fibrous material, and a resin layer interposed between and bonding the wood veneer sheet and the synthetic fibrous sheet together to form a laminate composite structure. The wood provides stiffness to the structure and the attractive appearance of wood, the synthetic fibrous sheet provides stability and overall strength, and the resin, in addition to bonding the sheets together, adds significantly to the strength of the composite structure and further provides a moisture barrier for the wood.

According to a further feature of the invention, the resin comprises a clear liquid epoxy resin and a coating of the resin is applied to the exterior surface of the wood veneer so that the wood is totally encapsulated by the exterior resin coating and the resin layer interposed between the wood veneer sheet and the synthetic fibrous sheet.

According to a further feature of the invention, there are two sheets of wood veneer arranged with their grains crossing with respect to one another, resin is interposed between and bonds the two sheets of wood veneer together, and further resin is interposed between and bonds the inner wood veneer sheet and the sheet of synthetic fibrous material. The mutually cross-grained arrangement of the two sheets of veneer adds significantly to the strength and stiffness of the composite structure.

According to a further feature of the invention, a sheet of core material having a grain strength running generally normal to the plane of the sheets of wood veneer and the sheet of synthetic fibrous material is juxtaposed to the sheet of synthetic fibrous material and further resin is interposed between and bonds the sheet of synthetic fibrous material to the sheet of core material. The resulting composite laminate structure provides grain strength in the X, Y, and Z direction as provided respectively by one of the wood veneer sheets, the other of the wood veneer sheets, and the sheet of core material.

According to yet another feature of the invention, a further sheet of synthetic fibrous material is juxtaposed to the exposed surface of the sheet of core material and further resin is interposed between and bonds the sheet of core material and the further sheet of synthetic fibrous material. This arrangement provides a sandwich construction which is extremely rigid and which provides high strength in all directions of stress.

In the disclosed embodiment of the invention, the sheets of synthetic fibrous material comprise sheets of triaxial fiberglass and the sheet of core material comprises a sheet of end grain balsa wood. The wood veneer sheets, the balsa core sheet, and the triaxial fiberglass sheets together provide an extremely rigid and strong composite laminate structure and the resin interposed between the various layers and covering the outside surface of the outer wood veneer sheet adds to the structural strength of the composite structure, provides firm bonding between the various sheets, and provides an effective moisture barrier for the wood so that the composite structure retains the appearance and stiffness advantages of wood while substantially eliminating the moisture related problems previously associated with a wood structure.

The invention further comprises a method of forming a boat hull utilizing the invention veneer laminate composite structure. The invention boat building method comprises forming a mold having a configuration conforming to the shape of the desired boat hull; placing a plurality of strakes of a wood veneer material adjacent the mold surface with the strakes running generally parallel to the longitudinal center line of the hull and the grain of the strakes extending generally in the plane of the strakes; applying a resin to the exposed surfaces of the strakes; placing a sheet of wood veneer adjacent the strakes with the grain of the sheet extending generally in the plane of the sheet but at cross angles with respect to the grain of the strakes; applying a resin to the exposed surface of the wood veneer sheets; placing a sheet of synthetic fibrous material adjacent the wood veneer sheet; applying a resin to the exposed surface of the sheet of synthetic fibrous material; placing a sheet of core material adjacent the sheet of synthetic fibrous material having a grain strength running in a direction generally normal the plane of the sheets; applying a resin to the exposed surface of the sheet of core material; placing a further sheet of synthetic fibrous material adjacent the sheet of core material; and pressing the strakes and sheets together to bond them and form a boat hull conforming in shape to the shape of the mold. The boat hull is then removed from the mold and a coating of resin is applied to the exposed surfaces of the strakes to seal those surfaces while preserving the natural wood appearance. The invention method provides a boat hull having superior stiffness and strength characteristics and which retains the appearance and feel of a wooden boat while substantially eliminating the maintenance problems that have previously plagued wooden boats. The invention method also allows high volume reusable mold techniques to be applied to the construction of wood boats, as opposed to the tedious and labor intensive custom or kit techniques previously employed in wooden boat construction.

BRIEF DESCRIPTION OF THE DRAWINGS

FIG. 1 is an edge view of the veneer laminate composite structure according to the invention;

FIG. 2 is a exploded view of the structure of FIG. 1; and

FIG. 3 is a view showing a method and apparatus for building a boat hull utilizing the invention composite structure.

DETAILED DESCRIPTION OF THE PREFERRED EMBODIMENT

The veneer laminate composite structure as seen in FIG. 1 includes a first sheet of wood veneer 10, a second sheet of wood veneer 12, a sheet of synthetic fibrous material 14, a sheet of core material 16, and a further sheet of synthetic fibrous material 18. A resin layer 20 is interposed between each of the sheets to bond the sheets together and a coating of resin 22 is applied to the exposed surface of wood veneer sheet 10. The wood veneer sheets 10 and 12 may, for example, comprise African mahogany. Sheets of synthetic fibrous material 14 and 18 may take various forms including sheets of carbon impregnated glass or sheets of woven nylon fiber. Preferably, sheets 14 and 18 comprise triaxial fiberglass sheets having fibers oriented at 0°, 45°, and 90°. The sheet of core material 16 may take various forms including aluminum honeycomb, paper core honeycomb, or any sheet material having a primary grain strength running in a direction generally normal to the plane of the sheet. Preferably, sheet 16 comprises a sheet of end grain balsa wood. The resin employed for the interposed layers 20, as well as for the finish coating 22, preferably comprises a clear liquid epoxy resin specifically designed to wet-out wood fiber. Such a resin is available, for example, from Gougeon Brothers, Inc. of Bay City, Mich. as WEST SYSTEM 105 epoxy resin and WEST SYSTEM 205 hardener. The identified resin and hardener fill the voids and irregularities in the confronting surfaces of the various sheets and effectively lock the sheets together. The resin and hardener also penetrate the surfaces of the sheets to a depth of, for example, between 0.005 and 0.015 inches and thereby add measurably to the overall strength of the composite structure.

As seen in FIG. 2, the outer wood veneer sheet 10 may comprise an assembly of longitudinal planks or strakes 24 separated by a series of narrow strips 26 of any suitable black wood such as black walnut or black ebony. The grain of wood veneer strakes 24 preferably extends generally lengthwise of the strakes. Wood veneer sheet 12 has a grain extending in the plane of the sheet but at cross angles with respect to the grain of strakes 24. The primary grain of core sheet 16, whether it comprises the preferred end core balsa or a suitable honeycomb material, provides grain strength running in a direction generally normal to the plane of sheets 10 and 12 so that the composite structure provides grain strength in the X, Y and Z directions with grain strength in the X direction provided by composite wood veneer sheet 10, grain strength in the Y direction provided by wood veneer sheet 12, and grain strength in the Z direction provided by core sheet 16.

The use of the invention composite laminate structure in the formation of a boat hull is illustrated in FIG. 3. A female mold 28 of fiberglass or the like is provided to supply the basic hull configuration. Mold 28 is preferably suitably journaled as at 30 so as to allow the mold to be pivoted so that hull may be built up in arcuate sections with maximum gravity assist being provided for each of the several arcuate sections by selective rotation of the mold about pivot 30. For example, and as shown, the boat hull may be built up in four equal 45° arcuate sections with the mold being tilted after completion of each section to bring the next section into a position providing maximum gravity assist.

To form the boat hull, a plurality of strakes 24 are placed adjacent the mold surface with the strakes running generally parallel to the longitudinal center line of the hull so that the grain of the strakes extends generally parallel to the hull center line. Separation strips 26 are positioned between adjacent strakes and the strips and strakes may be temporarily secured in position against the mold surface by the use of double sided masking tape. After the strakes and strips constituting a particular arcuate section of the hull have been positioned against the mold, epoxy resin is applied to the exposed inner surfaces of the strakes and strips whereafter a wood veneer sheet 12 is placed adjacent the strakes with the grain of sheet 12 extending generally at cross angles with respect to the grain of the strakes. Another layer of resin is now applied to the exposed inner surface of sheet 12 and a sheet of fiberglass 14 is placed adjacent the exposed inner surface of sheet 12. Another layer of resin is now applied to the exposed inner surface of fiberglass sheet 14 and a sheet 16 of end core balsa wood is placed adjacent the exposed inner surface of fiberglass sheet 14 with the end grain of the balsa wood sheet running in a direction normal to the grain of wood veneer sheet 12 and normal to the grain of strakes 24. A further layer of resin is now applied to the exposed inner surface of end grain balsa wood sheet 16 and a further sheet of fiberglass 18 is positioned adjacent the exposed inner surface of balsa wood sheet 16. The various sheets are now pressed together by the use of sandbags 32 or the like to allow the epoxy to initially cure. Alternatively, less than all of the sheets may be pressed together and allowed to initially cure, whereafter the remainder of the sheets may be applied to the initially cured sheets and pressed together. For example, sheets 10, 12 and 14 may be positioned and pressed together and allowed to initially cure, whereafter sheets 16 and 18 may be added and pressed together. When using the identified epoxy resin and hardener, the initial cure, whether of some or all of the sheets, will take approximately 20 minutes, whereafter the bags may be removed to allow a full cure which will occur after 8 to 10 hours. Following the full cure of all of the sheets, the boat hull may be removed from the mold 28 and a coating of resin 22, formed of the same resin as the resin layers 20 interposed between the various sheets, may be applied to the exterior surface of the strakes 24 and the strips 26 to provide a moisture seal for this exterior surface. Since the identified epoxy resin is clear, the resin seals the exterior surface of the hull while preserving the natural wood appearance. Alternatively, the boat hull may be formed in the mold consisting of sheets 12, 14, 16, and 18 and the strakes 24 and strips 26 may be applied to the exposed surface of wood veneer sheet 12 after the hull has been removed from the mold.

If desired, a veil coat 34 of fiberglass cloth may be applied over coating 22 and a further resin coating 36 applied to the exposed surface of fiberglass veil coat 34. Fiberglass cloth 34 may have a thickness of 0.005 inches and becomes transparent when wetted. Cloth 34 toughens the exterior surface of the hull to provide impact resistance and adds overall strength to the hull.

The resulting boat hull is extremely stress resistant in all directions, provides a superior stiffness-to-weight ratio, and preserves the sought after appearance and "feel" of a wood hull while substantially eliminating the moisture problems inherent in previous wood hull designs. The invention boat hull also lends itself to mass production techniques since all of the reusable mold techniques that have allowed volume low cost production of fiberglass hulls are equally applicable to the construction of the composite wooden hull of the invention.

Although the invention veneer laminate composite structure has been described with particular reference to its applicability in the boat building art, it will be recognized that the invention composite structure has many other applications. Specifically, the invention structure is usable and desirable in any environment, such as furniture manufacture, where a high strength-to-weight ratio is desired and/or a rotresistant wood material is desired.

When used to form a boat hull, the veneer laminate composite structure may, for example, have an overall thickness of 0.75 inches with each wood veneer sheet comprising a thickness of 0.0625 inches, each fiberglass sheet comprising a thickness of 0.0500 inches, the end grain balsa core sheet having a thickness of 0.4800 inches, and the various layers of resin together comprising a thickness of 0.045 inches. These thicknesses are of course not critical nor limiting but these particular thicknesses have been found to produce a superior structure, especially when applied in a boat building environment.

Although a preferred embodiment of the invention has been illustrated and described in detail, it will be apparent that various changes may be made in the disclosed embodiment without departing from the scope and spirit of the invention.

I claim:
1. A veneer laminate composite structure comprising:
   A. at least one sheet of wood veneer;
   B. a sheet of synthetic fibrous material;
   C. a resin interposed between and bonding said sheets together;
   D. a sheet of core material having a grain strength running in a direction generally normal to the plane of said sheets and juxtaposed to said sheet of synthetic fibrous material; and
   E. further resin interposed between and bonding said sheet of synthetic fibrous material and said sheet of core material.
2. A veneer laminate composite structure according to claim 1 wherein:
   F. there are two sheets of wood veneer arranged with their grains extending in the plane of the sheets but crossing with respect to each other;
   G. resin is interposed between and bonds said two sheets of wood veneer together; and
   H. further resin is interposed between and bonds one of said wood veneer sheets and said sheet of synthetic fibrous material, whereby said composite structure provides grain strength in the X, Y and Z directions as provided respectively by one of said wood veneer sheets, the other of said wood veneer sheets, and said sheet of core material.
3. A veneer laminate composite structure according to claim 2 wherein:
   I. said sheet of core material comprises a sheet of end grain balsa wood.
4. A veneer laminate composite structure according to claim 2 and further including:
   I. a further layer of resin applied to the exposed surface of the other of said wood veneer sheets to seal that surface.
5. A veneer laminate composite structure according to claim 2 and further including:
   I. a further sheet of synthetic fibrous material juxtaposed to the exposed surface of said sheet of core material; and
   J. further resin interposed between and bonding said sheet of core material and said further sheet of synthetic fibrous material.
6. A veneer laminate composite structure according to claim 5 wherein:
   K. said sheets of synthetic fibrous material comprise sheets of fiberglass.
7. A veneer laminate composite structure according to claim 6 wherein:
   L. said resin comprises a liquid epoxy resin.
8. A veneer laminate composite structure comprising:
   A. a first sheet of wood veneer having its grain extending generally in the plane of the sheet;
   B. a second sheet of wood veneer juxtaposed to said first sheet and having its grain extending generally in the plane of the sheet but generally at cross angles with respect to the grain of said first sheet;
   C. a resin interposed between and bonding said wood veneer sheets together;
   D. a first sheet of synthetic fibrous material juxtaposed to said second sheet of wood veneer;
   E. further resin interposed between and bonding said second sheet of wood veneer and said first sheet of synthetic fibrous material;
   F. a sheet of core material juxtaposed to said first sheet of synthetic fibrous material and having a grain strength running in a direction that is generally normal to the plane of said sheets;
   G. further resin interposed between and bonding said sheet of core material and said first sheet of synthetic fibrous material;
   H. a second sheet of synthetic fibrous material juxtaposed to said sheet of core material; and
   I. further resin interposed between and bonding said sheet of core material to said second sheet of synthetic fibrous material.
9. A veneer laminate composite structure according to claim 8 wherein:
   J. said resin comprises a clear liquid epoxy resin; and
   K. a layer of resin is applied to the exposed surface of said first wood veneer sheet to seal that surface while preserving the natural wood appearance.
10. The veneer laminate composite structure according to claim 9 wherein:
   L. said sheets of synthetic fibrous material comprise fiberglass sheets; and
   M. said sheet of core material comprises a sheet of end grain balsa wood.

* * * * *